United States Patent [19]
Van Boven et al.

[11] Patent Number: 5,807,052
[45] Date of Patent: Sep. 15, 1998

[54] PRE-ASSEMBLED MANIFOLD FASTENER SYSTEM AND METHOD THEREFOR

[75] Inventors: Albert W. Van Boven, Schaumburg; James D. Jones, Jr., Palatine, both of Ill.

[73] Assignee: Illinois Tool Works Inc., Glenview, Ill.

[21] Appl. No.: 883,788

[22] Filed: Jun. 27, 1997

[51] Int. Cl.$^6$ ............................. F16B 21/18; F16B 43/02; F16B 39/24

[52] U.S. Cl. ........................ 411/353; 411/156; 411/537; 411/999

[58] Field of Search ..................................... 411/107, 352, 411/353, 155, 156, 368, 537, 999, 544

[56] References Cited

U.S. PATENT DOCUMENTS

| | | |
|---|---|---|
| 3,156,281 | 11/1960 | Demi . |
| 4,193,434 | 3/1980 | Wagner . |
| 4,334,599 | 6/1982 | Ritsema et al. ...................... 411/537 X |
| 4,396,327 | 8/1983 | Menke ................. 411/107 X |
| 4,621,961 | 11/1986 | Gulistan . |
| 4,732,519 | 3/1988 | Wagner . |
| 4,952,107 | 8/1990 | Dupree . |
| 5,020,951 | 6/1991 | Smith . |
| 5,094,579 | 3/1992 | Johnson . |
| 5,244,325 | 9/1993 | Knohl . |
| 5,328,311 | 7/1994 | Knohl . |
| 5,382,124 | 1/1995 | Frattarola . |
| 5,584,628 | 12/1996 | Bernoni ................................ 411/537 X |
| 5,662,444 | 9/1997 | Schmidt, Jr. et al. .............. 411/353 X |

*Primary Examiner*—Neill R. Wilson
*Attorney, Agent, or Firm*—Thomas W. Buckman; John P. O'Brien; Donald J. Breh

[57] ABSTRACT

A pre-assembled workpiece fastenable to a mounting surface of a second workpiece, and in one application a pre-assembled plastic component fastenable to a metal automotive engine component. The pre-assembled workpiece includes an opening extending therethrough between an outer surface and a mounting surface thereof. A sleeve member is retainably disposed in the opening through the pre-assembled workpiece, and a fastener having a threaded shank portion and a head is retainably disposed through the sleeve member. The fastener is axially and laterally positionable relative to the pre-assembled workpiece, whereby the pre-assembled workpiece is mountable and alignable on the mounting surface of the second workpiece without interference from the fastener. The sleeve member includes a resilient first substantially radial flange member, whereby the sleeve member is axially positionable relative to the opening through the pre-assembled workpiece upon fastening the pre-assembled workpiece to the second workpiece to compensate for misalignment tolerance and thermal expansion of the pre-assembled workpiece.

18 Claims, 2 Drawing Sheets

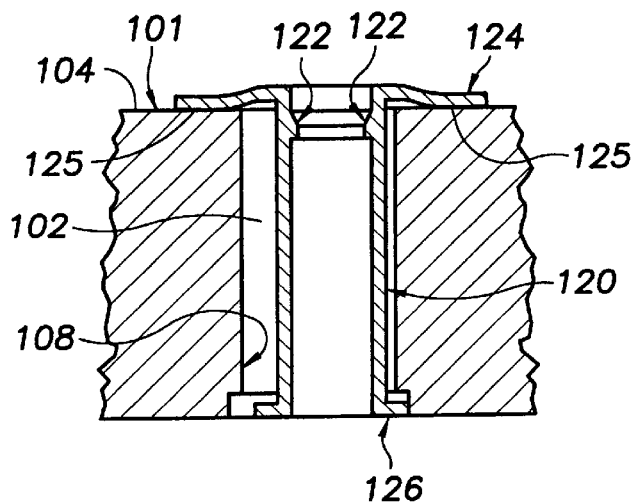
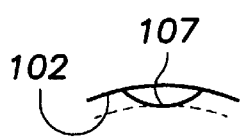
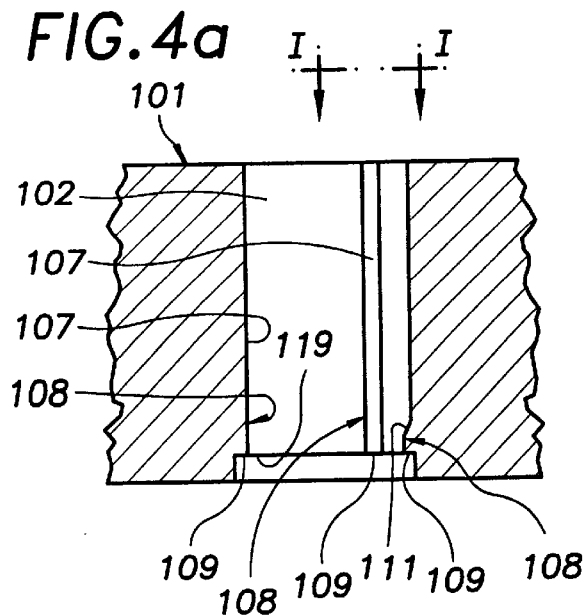
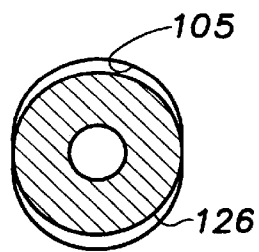
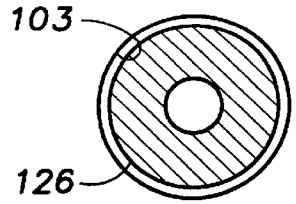

PRE-ASSEMBLED MANIFOLD FASTENER SYSTEM AND METHOD THEREFOR

BACKGROUND OF THE INVENTION

The invention relates generally to systems and methods for a pre-assembled workpiece fastenable to a second workpiece wherein the pre-assembled workpiece compensates for manufacturing tolerances, misalignment and differing thermal expansion characteristics between workpieces, and more particularly to systems and methods for a pre-assembled plastic component mountably fastenable to a metal automotive engine by a fastener, which is part of the pre-assembled component.

Fastening members are used widely to fasten a first workpiece in mounted relation to a second workpiece, and in assembly lines and other operations it is known to pre-assemble one or more fastening members with one of the workpieces to facilitate subsequent assembly thereof with other components. The assembly of rocker arm covers, or manifolds, to internal combustion engines in the automotive industry is representative of one such application among many others where pre-assembled workpieces are employed with significant economic advantage. U.S. Pat. No. 4,732,519 entitled "Fastener Assembly With Axial Play" issued 22 Mar. 1988 to Wagner and commonly assigned with the present invention, for example, discloses a pre-assembled valve cover having one or more fasteners and grommet assemblies retainably disposed in corresponding openings of the valve cover for subsequently fastening the valve cover to a head portion of an automotive engine. The U.S. Pat. No. 4,732,519 also teaches retaining the fasteners with sufficient axial play relative to the pre-assembled valve cover so that the fasteners do not project beyond an underside mounting surface thereof, thereby facilitating the mounting of the pre-assembled valve cover and alignment of the fasteners with corresponding holes in the engine head portion before tightening the fasteners.

Advances in polymer technologies now permit the manufacture and use of relatively lightweight and less costly moldable plastics in applications once requiring fabricated metals. This is true also for components used in variable temperature environments, including valve covers mounted on automotive engine heads, as discussed above. Plastics, and more generally most other materials, however are subject to molding and manufacturing tolerances which may result, for example, in lateral misalignment of fasteners retained in a pre-assembled workpiece relative to corresponding holes in a second workpiece on which the pre-assembled workpiece is mounted. Plastics and other materials are also susceptible to concentrations of stress and strain, and particularly to concentrations thereof proximate fastening members extending through a workpiece. And in applications where mountably fastened workpieces of unlike materials are subject to varying temperature extremes, differences in thermally induced stresses and strains may adversely affect one or both workpieces, especially in applications where a plastic is mountably fastened to a metal. Yet known existing workpieces pre-assembled with fastening members do not compensate for manufacturing and molding tolerances of the pre-assembled workpiece, or for fastener misalignment between first and second workpieces, or for the susceptibility of plastics and other materials of concentrations of stress and strain caused by fasteners, or for differing thermal expansion rates of unlike workpieces.

The present invention is thus directed toward advancements in the art of pre-assembled workpieces fastenable to a second workpiece by one or more fastening members and methods therefor that overcome problems in the prior art.

It is another object of the invention to provide a novel pre-assembled workpiece and method therefor that compensates for misalignment between the pre-assembled workpiece mountable on a second workpiece, that compensates for manufacturing tolerances of the pre-assembled workpiece, that compensates for the susceptibility of the pre-assembled workpiece, especially pre-assembled plastic workpieces, to concentrations of stress and strain caused fastening members, and that compensates for differing thermal characteristics of unlike workpieces.

It is a more particular object of the invention to provide a novel pre-assembled workpiece having a sleeve member retainably disposed in an opening therethrough, and a fastener retainably disposed through the sleeve member, whereby the fastener is axially and laterally positionable relative to the opening through the pre-assembled workpiece to permit mounting and alignment of the pre-assembled workpiece on a second workpiece without interference from the fastener retained by the pre-assembled workpiece.

It is yet a more particular object of the invention to provide a novel pre-assembled plastic cover member having a sleeve member retainably disposed in an opening therethrough, and a fastener retainably disposed through the sleeve member, whereby the fastener is axially and laterally positionable relative to the opening through the plastic cover member to permit mounting and alignment of the cover member on a metal automotive engine component without interference from the fastener of the pre-assembled plastic cover member.

It is another object of the invention to provide a novel pre-assembled workpiece and method therefor having a sleeve member retainably disposed in an opening therethrough, and a fastener retainably disposed through the sleeve member, whereby the fastener is laterally positionable relative to the pre-assembled workpiece by laterally positioning the sleeve member in an enlarged opening through the pre-assembled workpiece, or by laterally positioning the fastener relative to an enlarged opening of the sleeve member.

It is another object of the invention to provide a novel pre-assembled workpiece and method therefor having a sleeve member retainably disposed in an opening therethrough, and a fastener retainably disposed through the sleeve member, whereby the sleeve member is axially positionable relative to the opening through the pre-assembled workpiece by a first substantially radial flange of the sleeve member formed as a resilient spring member upon fastening the pre-assembled workpiece to the second workpiece.

It is a further object of the invention to provide a novel pre-assembled workpiece and method therefor having a sleeve member retainably disposed in an opening therethrough, and a fastener retainably disposed through the sleeve member, the sleeve member retainably coupled in the opening through the pre-assembled workpiece by a first inner surface of a first substantially radial flange of the sleeve member engageable with an outer surface of the pre-assembled workpiece and by a second inner surface of a second radial flange of the sleeve member engageable with an opening rib member, or protuberance, protruding into the opening through the pre-assembled workpiece.

It is still another object of the invention to provide a novel pre-assembled workpiece and method therefor having a sleeve member retainably disposed in an opening therethrough, and a fastener retainably disposed through the sleeve member, the fastener retainably coupled through the sleeve member by a head of the fastener engageable with a first end of a sleeve member and by a protruding shank rib member, or protuberance, of the fastener engageable with a sleeve rib member, or protuberance, protruding from an inner surface of the sleeve member.

These and other objects, features and advantages of the present invention will become more fully apparent upon careful consideration of the following Detailed Description of the Invention and the accompanying Drawings, which may be disproportionate for ease of understanding, wherein like structure and steps are referenced by corresponding numerals and indicators.

BRIEF DESCRIPTION OF THE DRAWINGS

FIG. 3 is a partial sectional view of a pre-assembled workpiece illustrating lateral positioning of a sleeve member relative to the pre-assembled workpiece.

FIG. 4a is a partial sectional view of a pre-assembled workpiece illustrating in more detail an opening through the pre-assembled workpiece.

FIG. 4b is partial to plan view along lines I—I of FIG. 4a.

FIG. 5a is a partial plan view along lines II—II of FIG. 2 according an exemplary embodiment of the invention.

FIG. 5b is a partial plan view along lines II—II of FIG. 2 according an alternative embodiment of the invention.

DETAILED DESCRIPTION OF THE INVENTION

Figure 1:
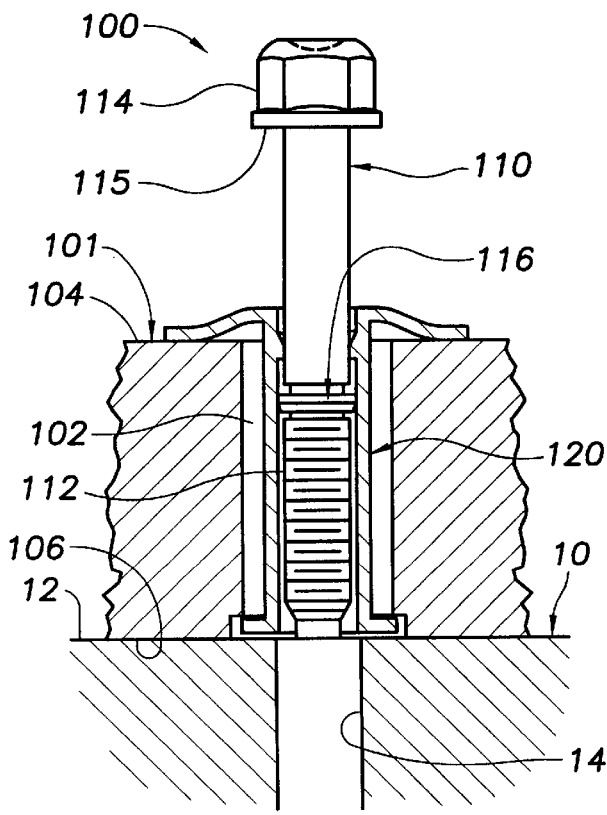
FIG. 1 is a partial sectional view of a pre-assembled workpiece retainably mountable on a second workpiece by a fastener of the pre-assembled workpiece according to an exemplary embodiment of the invention.

FIG. 1 is a partial sectional view of a pre-assembled workpiece 100 including a first workpiece 101 mountable on a mounting surface 12 of a second workpiece 10, and fastenable thereto by a fastener 110 retainably coupled to the first workpiece 101 and disposeable in a bore 14 of the second workpiece 10. In the exemplary application, the first workpiece 101 is a molded plastic intake manifold and the second workpiece 10 is an automotive engine component, but more generally the first workpiece 101 and the second workpiece 10 may be any members mountably fastenable together by a fastening member, wherein the workpieces are of like or unlike materials.

Figure 2:
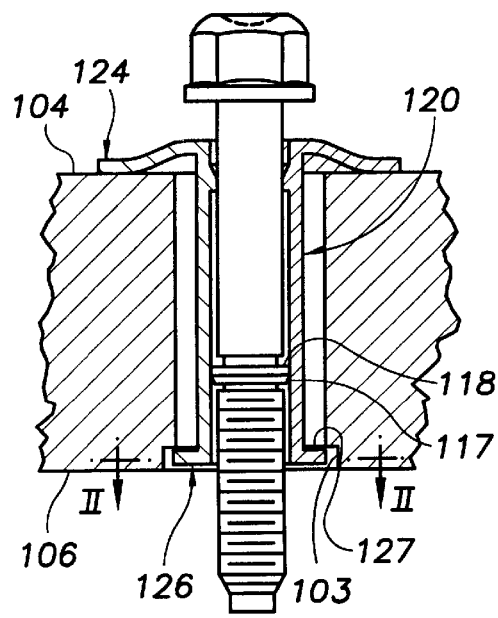
FIG. 2 is another partial sectional view of the pre-assembled workpiece of FIG. 1 illustrating axial positioning of the fastener relative thereto.

FIGS. 1 and 2 show a sleeve member 120 retainably disposed in an opening 102 extending through the first workpiece 101 between an outer surface 104 and a mounting surface 106 thereof. The fastener member 110 has a threaded shank portion 112 and a head 114, and is retainably disposed through the sleeve member 120. The fastener 110 is axially positionable through the sleeve member 120 relative to the opening 102 through the first workpiece 101 with sufficient axial play so that the fastener 110 does not always project beyond the mounting surface 106 thereof, thereby facilitating the mounting of the pre-assembled workpiece 100 and alignment of the fastener 110 with the corresponding hole 14 in the second workpiece 10 prior to tightening the fastener 110 without interference therefrom. The fastener 110 is also positionable laterally relative to the opening 102 through the first workpiece 101 to compensate for misalignment of the threaded portion 112 of the fastener 110 and the bore 14, wherein the misalignment may result from molding or manufacturing tolerances and other factors. This type of misalignment is particularly significant in applications, including rocker arm cover applications, where the pre-assembled workpiece includes a plurality of fasteners, which must be aligned with a corresponding plurality of bores in the second workpiece.

FIGS. 3, 4 and 6 of the exemplary embodiment show the opening 102 of the first workpiece 101 including a protruding opening rib member 108 on the inner surface thereof. The sleeve member 120 also has a first substantially radial flange 124 at a first end thereof and a second radial flange at a second end 126 thereof. A first inner surface 125 of the first substantially radial flange 124 is engageable with the outer surface 104 of the first workpiece 101, and a second inner surface 127 of the second radial flange 126 is engageable with the opening rib member or members 108 to retainably couple the sleeve member 120 to the first workpiece 101.

Figure 6A:
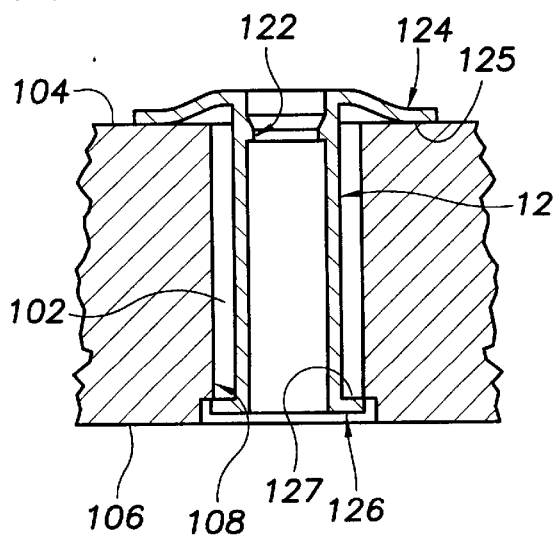
FIGS. 6a and 6b are partial sectional views of a pre-assembled workpiece illustrating another feature of the invention.

FIG. 4a shows the opening 102 through the first workpiece 101 having a plurality of at least two opening protruding rib members 108 arranged annularly on the inner surface thereof, wherein each opening rib member 108 has an axially aligned inclined surface 107, shown partially in FIG. 4b, and a substantially radial second flange engagement surface 109 engageable with the inner surface 127 of the second radial flange 126 of the sleeve member 120 as shown best in FIG. 6a. In one configuration shown in FIG. 4a, the axially inclined surface 107 extends substantially the entire length of the opening 102 for improved mechanical integrity. In an alternative configuration, the rib members 108 have an axially inclined surface 111 extending along a relatively short axial length of the opening 102, thus forming corresponding relatively discrete protuberances therein. According to a related aspect of the invention, the sleeve member 120 is disposable in the opening 102 by inserting and advancing the second flange 126 of the sleeve member 120 into the opening 102 from the outer surface 104 and along the inclined surface or surfaces 107 until the inner surface 127 of the second flange 126 is engaged by the radial surface or surfaces 109 of the opening rib member or members 108. According to this aspect of the invention, either or both of the opening rib members 108 and the second flange 126 of the sleeve member 120 are sufficiently resilient to allow passage of the second flange 126 along and over the inclined surface 107 of the opening rib members 108 until the sleeve member 120 is retainably coupled through the opening 102 of the first workpiece 101.

FIGS. 1–4 and 6 show the sleeve member 120 having a sleeve rib member, or protuberance, 122 protruding from an inner surface thereof, and more generally a plurality of sleeve rib members 122 arranged annularly about an inner sleeve surface. FIG. 6b shows each sleeve rib member 122 having an inclined surface 121 and a radial surface 123. The fastener 110 includes a protruding shank rib member, or protuberance, 116 extending from the shank portion and located between the threaded end portion 112 and the head 114, wherein the shank rib member 116 is more generally a plurality or continuous annularly arranged rib member as shown. FIG. 2 shows the shank rib member 116 having an inclined surface 117 and a radial surface 118. The radial surface 118 of the shank rib member 116 is engageable with the radial surface 123 of the sleeve rib member 122 and the head 114 of the fastener 110 has an enlarged flange portion 115 engageable with the first end of the sleeve member 120 to retainably couple the fastener 110 to the first workpiece. According to this aspect of the invention, the fastener 110 is axially positionable relative to the first workpiece so that the fastener 110 does not protrude beyond the mounting surface 106 of the first workpiece 101 during mounting and alignment. The fastener 110 is subsequently axially extendable into the bore 14 of the second workpiece 10. The inclined surface 121 of the sleeve rib member 122 and the inclined surface 117 of the shank rib member 116 cooperate and are sufficiently resilient to allow passage of the fastener 110 through the sleeve member 120 until the fastener is retainably disposed therein.

FIGS. 2 and 5a show an end of the opening 102 through the first workpiece 101 having an enlarged diameter counter-bore portion 103 relative to an outer diameter of the second flange 126 of the sleeve member 120. FIG. 4a illustrates the counter-bore also having a radial surface 119 adjacent the radial surfaces 109 of the opening rib members 108. Thus configured, sleeve member 120 is laterally positionable in the opening 102 relative to the first workpiece 101, and more particularly the second flange 126 is positionable laterally in the counter-bore portion 103. FIG. 5b shows the opening 102 through the first workpiece 101 having a counter-bore portion 105 enlarged in only one dimension to permit lateral positioning of the second flange 126 and more generally the sleeve member 120 in said one dimension. According to these embodiments, the fastener 110 is movable axially but not laterally relative to the sleeve member 120, and the sleeve member 120 and fastener 110 retainably coupled thereto are movable laterally relative to the first workpiece 101. All the while though the sleeve member 120 remains retainably coupled to the workpiece 101 as discussed herein by appropriate dimensioning of the second flange 126 and the opening rib members 108.

In a related alternative embodiment, the sleeve member 120 has an opening with an enlarged diameter relative to an outer diameter of the fastener 110, whereby the fastener is laterally positionable in the sleeve member 120 and thus relative to the first workpiece 101. According to this alternative embodiment, the fastener 110 is movable axially and laterally relative to the sleeve member 120, wherein the fastener 110 remains retainably coupled to the sleeve member 120 by appropriate dimensioning of the shank rib member 116 and the sleeve rib member 122. The sleeve member 120 however is substantially laterally fixed relative to the opening 102 of the first work piece 101. According to yet another alternative embodiment, the sleeve member 120 is laterally positionable relative to the opening 102 of the first workpiece 101 and the fastener 110 is laterally positionable relative to the sleeve member 120.

Figure 6B:
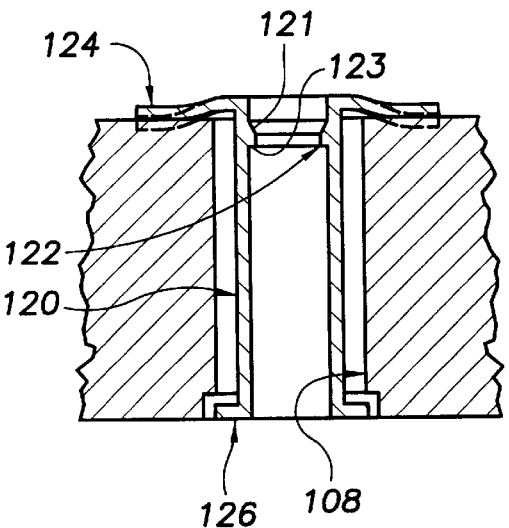

FIGS. 1, 2 and 6 show the first substantially radial flange member 124 of the sleeve member 120 formed as a resilient spring member, whereby the sleeve member 120 is axially positionable relative to the opening 102 through the first workpiece 101 upon fastening the first workpiece 101 to the second workpiece 10 with the fastener 110 and flexing the spring member. FIG. 6a shows the sleeve member 120 in a pre-assembled configuration, without the fastener 110 for clarity, wherein the resilient first substantially radially flange member 124 biases the sleeve member 122 partially withdrawn from the opening 102 of the first workpiece 101 so that the second radial flange member 126 is recessed relative to the mounting surface 106 of the first workpiece 101. FIG. 6b shows the resilient first substantially radial flange member 124 flexed, by clamping action of the fastener 110 not shown, to advance the sleeve member 120 into the opening 102 of the first workpiece 101 until the second radial flange member 126 is seated on the mounting surface 12 of the second workpiece 10. According to this aspect of the invention, flexed resilient first substantially radial flange member 124 maintains a prevailing torque on the fastener 110. The resilient first substantially radial flange member 124 is also flexible to allow expansion and contraction of the first workpiece 101 while maintaining the prevailing torque on the fastener 110 under variable temperature conditions. The first substantially radial flange member 124 also distributes the retention load of the fastener 110 over an increased surface area of the first workpiece 101, and the second radial flange member 126 distributes the retention load of the fastener 110 over an increased surface area of the second workpiece 10, thereby reducing any concentration of retention forces applied to the workpieces.

While the foregoing written description of the invention enables anyone skilled in the art to make and use what is at present considered to be the best mode of the invention, it will be appreciated and understood by anyone skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. A pre-assembled workpiece fastenable to a mounting surface of a second workpiece, and useable for retaining a fastener, the pre-assembled workpiece comprising:

an opening extending through the pre-assembled workpiece between an outer surface of the pre-assembled workpiece and a mounting surface of the pre-assembled workpiece;

a unitary sleeve member disposed in the opening through the pre-assembled workpiece, the unitary sleeve member having a second radial flange at a second end of the unitary sleeve member;

a diameter of the opening through the pre-assembled workpiece greater than an outer diameter of the unitary sleeve member, an opening rib member extending from the opening through the pre-assembled workpiece, a second inner surface of the second radial flange engageable with the opening rib member to retainably couple the unitary sleeve member to the pre-assembled workpiece, the unitary sleeve member is laterally positionable in the opening of the pre-assembled workpiece.

2. The pre-assembled workpiece of claim 1, the unitary sleeve member having a first substantially radial flange at a first end of the unitary sleeve member, a first inner surface of the first substantially radial flange engageable with the outer surface of the pre-assembled workpiece to retainably couple the unitary sleeve member to the pre-assembled workpiece.

3. The pre-assembled workpiece of claim 1, the sleeve member having a protuberance extending from an inner surface of the sleeve member, and the fastener having a protuberance extending from the shank, the head of the fastener engageable with the first end of the sleeve member and the protuberance of the fastener engageable with the protuberance of the sleeve member to retainably couple the fastener to the pre-assembled workpiece.

4. The pre-assembled workpiece of claim 1, the pre-assembled workpiece is a plastic component fastenable to a metal automotive engine component.

5. The pre-assembled workpiece of claim 1, the opening rib member having an axially aligned inclined surface and a substantially radial second flange engagement surface engageable with the second radial flange.

6. The pre-assembled workpiece of claim 1, the opening through the pre-assembled workpiece having a counter-bore portion on the mounting surface of the pre-assembled workpiece, a diameter of the counter-bore portion greater than a diameter of the second radial flange of the unitary sleeve member, whereby the second radial flange of the unitary sleeve member is laterally positionable in the counter-bore portion of the pre-assembled workpiece.

7. The pre-assembled workpiece of claim 6, the diameter of the counter-bore portion of the opening through the pre-assembled workpiece greater than the diameter of the second flange in only one dimension to permit lateral positioning of the unitary sleeve member in said one dimension.

8. The pre-assembled workpiece of claim 1 further comprising a resilient first substantially radial flange member engageable with the outer surface of the pre-assembled workpiece, whereby the unitary sleeve member is axially positionable relative to the opening through the pre-assembled workpiece by flexing the resilient first substantially radial flange member upon fastening the pre-assembled workpiece to the second workpiece.

9. The pre-assembled workpiece of claim 1, the opening rib member extending axially along substantially the entire length of the opening.

10. The pre-assembled workpiece of claim 1, the rib member is a discrete protuberance extending along a short axial length of the opening and located proximate the mounting surface of the pre-assembled workpiece.

11. The pre-assembled workpiece of claim 1, the second radial flange of the unitary sleeve member is a resilient material that flexibly cooperates with the opening rib member to retainably assemble the unitary sleeve member with the pre-assembled workpiece.

12. A pre-assembled workpiece fastenable to a mounting surface of a second workpiece, the pre-assembled workpiece comprising:

an opening extending through the pre-assembled workpiece between an outer surface of the pre-assembled workpiece and a mounting surface of the pre-assembled workpiece, the opening having a protruding opening rib member;

a sleeve member retainably disposed in the opening through the pre-assembled workpiece, the sleeve member having a first substantially radial flange at a first end and a second radial flange at a second end, a first inner surface of the first substantially radial flange engageable with the outer surface of the pre-assembled workpiece, and a second inner surface of the second radial flange engageable with the opening rib member to retainably couple the sleeve member to the pre-assembled workpiece;

a fastener retainably disposed through the sleeve member, the fastener having a shank and a head, the fastener axially positionable through the sleeve member relative to the pre-assembled workpiece, and the fastener laterally positionable relative to the pre-assembled workpiece, whereby the pre-assembled workpiece is mountable and alignable on the mounting surface of the second workpiece without interference from the fastener retainably coupled to the pre-assembled workpiece.

13. A pre-assembled workpiece fastenable to a mounting surface of a second workpiece, the pre-assembled workpiece comprising:

an opening extending through the pre-assembled workpiece between an outer surface of the pre-assembled workpiece and a mounting surface of the pre-assembled workpiece;

a sleeve member retainably disposed in the opening through the pre-assembled workpiece, the sleeve member having a first substantially radial flange at a first end, the first substantially radial flange is a resilient spring member engageable with the outer surface of the pre-assembled workpiece, the sleeve member axially positionable relative to the opening through the pre-assembled workpiece upon fastening the pre-assembled workpiece to the second workpiece;

a fastener retainably disposed through the sleeve member, the fastener having a shank and a head, the fastener axially positionable through the sleeve member relative to the pre-assembled workpiece, and the fastener laterally positionable relative to the pre-assembled workpiece, whereby the pre-assembled workpiece is mountable and alignable on the mounting surface of the second workpiece without interference from the fastener retainably coupled to the pre-assembled workpiece.

14. A method for a pre-assembled workpiece fastenable to a mounting surface of a second workpiece, the method comprising:

retainably disposing a sleeve member in an opening through the pre-assembled workpiece by engaging a first inner surface of a first substantially radial flange of the sleeve member with an outer surface of the pre-assembled workpiece and by engaging a second inner surface of a second radial flange of the sleeve member with an opening rib member protruding into the opening through the pre-assembled workpiece;

retainably disposing a fastener having a shank and a head through the sleeve member;

axially positioning the fastener through the sleeve member relative to the pre-assembled workpiece;

laterally positioning the fastener relative to the pre-assembled workpiece, whereby the pre-assembled workpiece is mountable and alignable on the mounting surface of the second workpiece without interference from the fastener retainably coupled to the pre-assembled workpiece.

15. The Method of claim 14, laterally positioning the fastener relative to the pre-assembled workpiece by laterally positioning the sleeve member relative to the pre-assembled workpiece, the sleeve member retainably disposed in an enlarged opening through the pre-assembled workpiece.

16. The method of claim 14, laterally positioning the fastener relative to the pre-assembled workpiece by laterally positioning the fastener relative to the sleeve member, the fastener retainably disposed in an enlarged opening of the sleeve member.

17. The method of claim 14, retainably coupling the fastener through the sleeve member by engaging a head of the fastener with a first end of the sleeve member and by engaging a protuberance extending from the shank of the fastener with a protuberance extending from an inner surface of the sleeve member.

18. The method of claim 14 further comprising axially positioning the sleeve member relative to the opening through the pre-assembled workpiece by flexing the first substantially radial flange of the sleeve member engageable with the outer surface of the pre-assembled workpiece.

* * * * *